Aug. 15, 1933.  S. P. ECKBERG  1,922,284
POWER PROPELLED MOWER
Filed March 21, 1933  4 Sheets-Sheet 1

Inventor
S. P. Eckberg
By Clarence A. O'Brien
Attorney

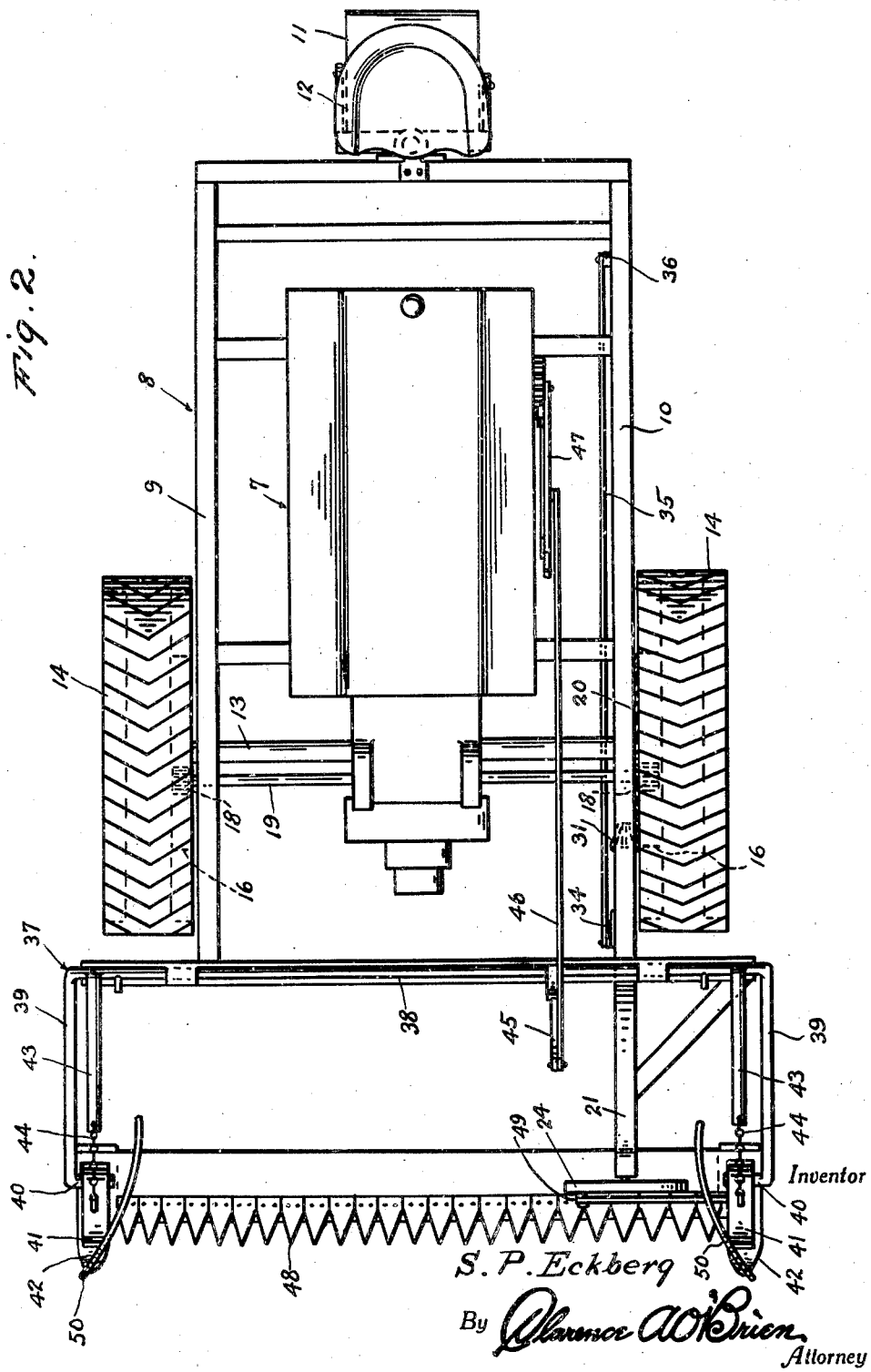

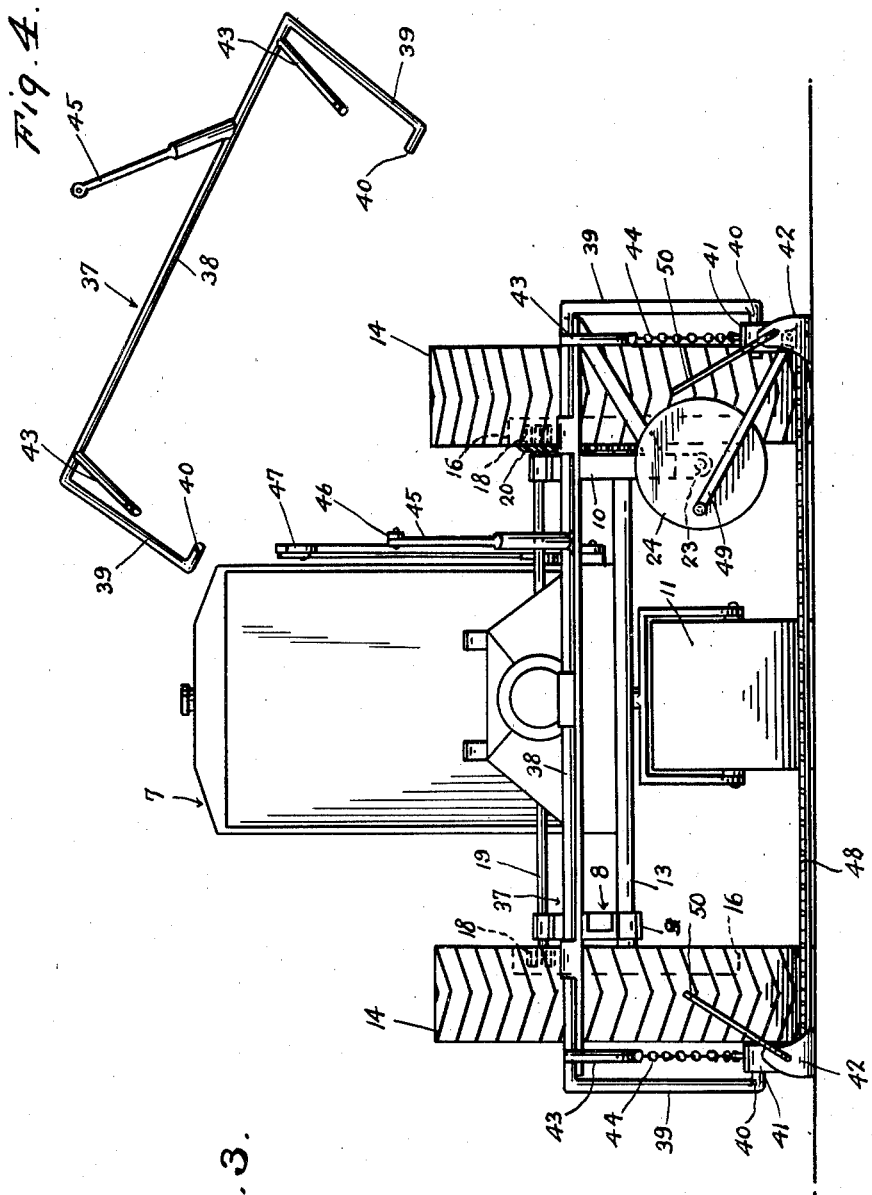

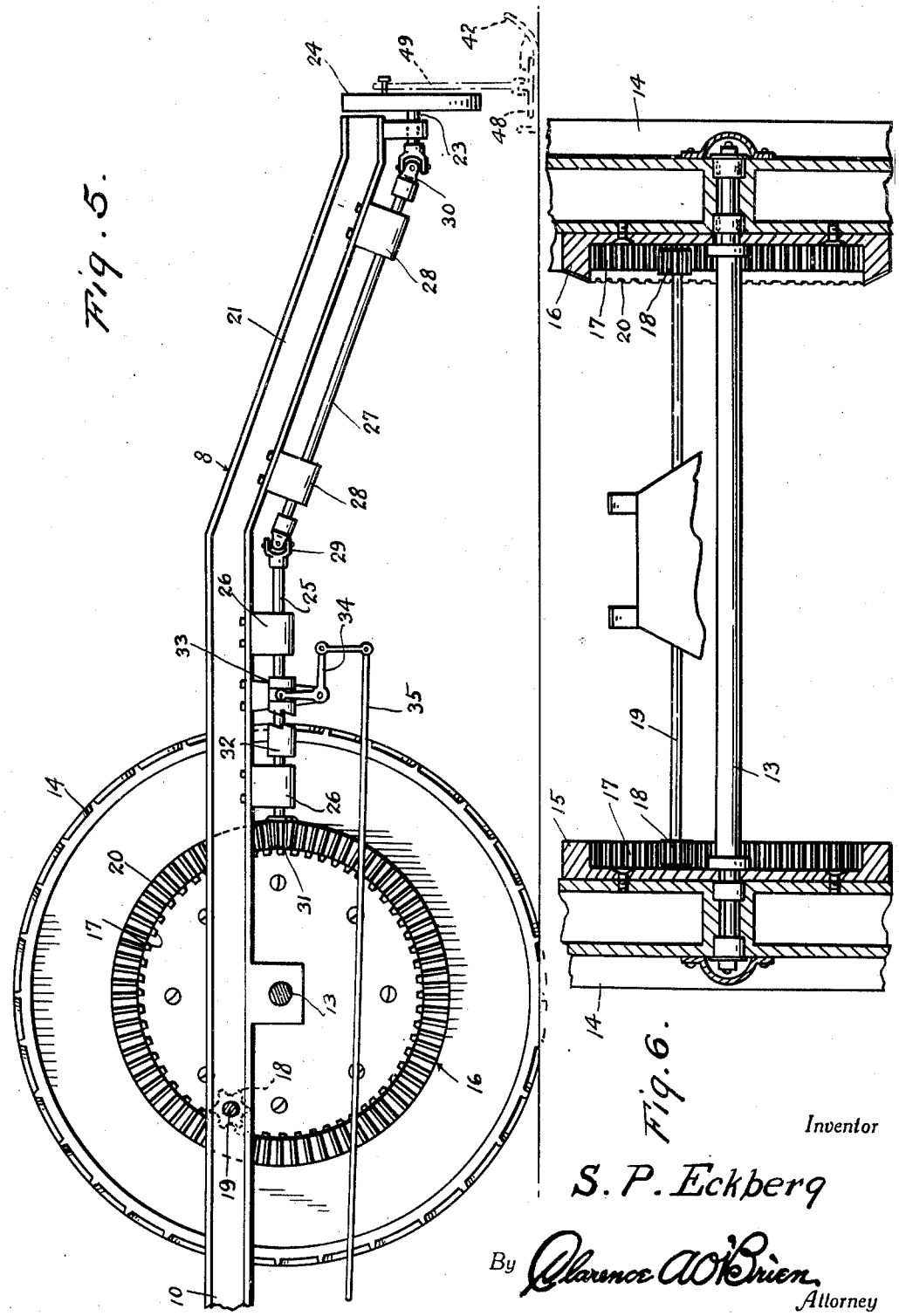

Patented Aug. 15, 1933

1,922,284

UNITED STATES PATENT OFFICE 1,922,284

POWER PROPELLED MOWER

Swan P. Eckberg, Ames, Iowa

Application March 21, 1933. Serial No. 661,993

3 Claims. (Cl. 56—25)

This invention relates to an improved mower of the horizontally disposed longitudinally reciprocatory type, and has more particular reference to the supporting, propelling and operating means therefor.

In carrying the principles of the inventive conception into practice I have found it expedient and practical to utilize a tractor having an especially designed frame to accommodate the supporting and motion transmitting means for the reciprocatory sickle bar and its associated details.

One structural feature of the improved assembly is the novel power or motion transmitting means between one of the ground engaging wheels and a rotary eccentric, wherein the eccentric is connected with the cutter or sickle bar through the instrumentality of a pitman connecting rod, permitting the rotary eccentric to supply the necessary reciprocatory movement to the cutter bar.

Another feature of the improvement is found in the specific construction of the oscillatory frame mounted for rocking movement on the tractor frame and operatively connected with the mower means for raising and lowering the latter as a unit to allow it to assume the requisite position to compensate for irregularities in the surface being treated.

Other features and advantages will become apparent from the following description and drawings.

In the drawings:

Figure 2 is a top plan view of the structure shown in Figure 1.

Figure 3 is an end elevation thereof observing the structure in a direction from right to left in either Figures 1 or 2.

Figure 4 is a detail perspective view of the rocker frame.

Figure 5 is a fragmentary detail sectional and elevational view illustrating the gearing and shafting utilized for operating the reciprocatory cutter.

Figure 6 is a view detailing the gearing ensemble.

Figure 1:
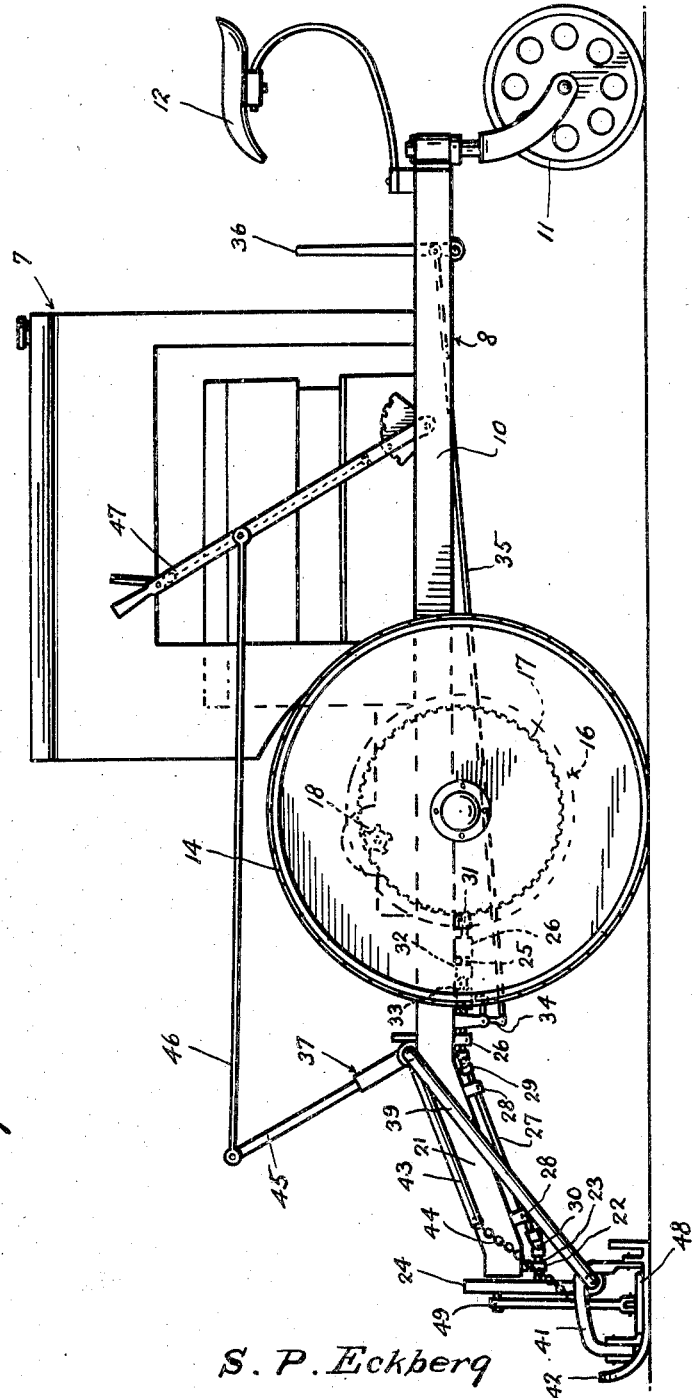
Figure 1 is a side elevational view of a tractor revised in accordance with the principles of the present invention and showing the special adaptation and construction of parts constituting the alleged novelty of the improved mower construction.

I will describe first the primary details of the tractor. In this connection I call attention to the fact that this tractor may be of any suitable construction. The power plant 7 is mounted on a substantially U-shaped frame 8 embodying spaced parallel side bars 9 and 10 respectively. At one end of the frame is a swivelly mounted caster 11 and the operator's or attendant's seat 12.

At the opposite end portion of the frame is the transverse rotatably mounted axle 13 at the ends of which are the ground engaging traction wheels 14. These wheels are of such construction that the ribs are properly ribbed to afford tenacious traction so that the machine may be successfully utilized on inclines and hills.

I now call attention to Figure 6, wherein it will be observed that power take-off devices 15 and 16 are bolted or otherwise secured to the wheels against the inner faces thereof. These devices are of general cup-shaped form and provided with gear teeth 17 defining what may be conveniently designated as ring gears.

Pinions 18 on the ends of a rotatably mounted shaft 19 are meshed with these ring gears to drive the wheels in a suitable manner. The attachment 16 is provided with a bevelled annular gear 20 with which the operating means of the improvement is associated in a manner shown in Figure 5. Up to this point in the description, the details are more or less immaterial so far as the improvement is concerned.

I now call attention to Figure 5, wherein it will be noticed that in accordance with the invention the frame bar 10 is provided with a forwardly and downwardly inclined extension 21. At its extremity, this extension is formed with a hanger bearing 22 to support the stub shaft of the rotary eccentric 24.

A sectional motion transmitting shaft is arranged between the annular bevelled gear 20 and the stub shaft 23. As shown in Figure 5 this comprises an inner shaft section 25 mounted in appropriate bearings 26 and a companion shaft 27 mounted in supplemental bearings on the frame extension bar 21. These shaft sections are joined together by a universal joint 29 and there is another universal joint at 30 between the shaft 27 and the stub shaft 23.

The shaft section 25 is provided with a bevelled pinion 31 operatively connected with the annular gear 20. On this shaft section is a clutch element 32 with which the relatively slidable clutch element 33 is co-operable, the clutch element 33 being operated by the bellcrank 34 which is in turn actuated through the instrumentality of an operating rod 35 connected with a control lever 36 on the tractor frame as shown in Figure 1.

I next call attention to the numeral 37 which as shown in Figure 4 designates a lifting and lowering yoke or frame. This is of general U-shaped form and comprises a rocker shaft 38 mounted for oscillation in suitable bearings on the frontal end portion of the tractor frame. At opposite ends of this are lifting arms 39 terminating in inturned lifting fingers 40, the fingers being operatively connected with U-shaped hoisting members 41 (see Figure 1) carried by slidable ground contacting shoes 42. The numerals 43 designate stabilizing arms on the rocker frome connected by equalizing chains 44 with the U-shaped members 41. The numeral 45 designates the rocker or actuating arm which is connected by a link 46 to the main actuating lever 47. This is mounted within convenient reach of the occupants of the seat and associated with appropriate latch or retaining means in the manner shown.

The reciprocatory sickle or cutter bar is differentiated by the numeral 48 and is operatively connected with the rotary eccentric through the medium of a pitman 49 as shown plainly in Figures 1 and 3. The numerals 50 in Figure 3 represent suitably positioned and shaped grass and weed guides carried by the upturned end portions of the shoes and located to aid in feeding and guiding the cutter in effective engagement with the grass.

As before intimated, one structural distinction of the assemblage is predicated on the adaptation and use of the special lifting and lowering yoke or frame 37 mounted for oscillation or rocking movement on appropriate bearings on the tractor frame, actuated through the instrumentality of conveniently located means, and connected with the mowing mechainism in a manner to permit it to be raised or lowered as conditions require for effectively accommodating irregularities in the surface being acted on.

The mowing mechanism may be of any appropriate construction so long as it is provided with the shoes 42 and the U-shaped members 41 or equivalent means whereby to permit pivotal attachment of the fingers 40 to allow the mechanism, as a unit, to be raised or lowered in a proper perpendicular line. Specific novelty is of course predicated on the stabilizing and steadying arms 43 with their chain connections 44 between the arms and U-shaped members 41.

The idea in the adoption and use of the U-shaped tractor frame having the extension 21 carried by the side bar 10 constitutes an improvement in that this affords appropriate and dependable supporting means for the bearings 26 and 28 to accommodate the shafts 25 and 27. This insures proper transmission of motion from the bevelled gear 20 to the rotary eccentric 24. Likewise it insures dependable conversion of the rotary motion of the shafts into reciprocatory motion for the cutter bar 48 by way of the pitman connection 49. Incidentally, the remote control for the clutch elements 32 and 33 constitutes an added feature in this specific arrangement.

A careful consideration of the foregoing description in conjunction with the illustrative drawings will enable the reader to obtain a clear understanding of the purpose, features and advantages, the explicit construction, and the invention as hereinafter claimed.

It is to be understood that minor changes in shape, size, relative proportions, and materials may be resorted to in practice without departing from the spirit of the invention or the scope of the invention as now claimed.

I claim:

1. In a structure of the class described, in combination, a mobile support, a mower embodying a substantially horizontal longitudinally reciprocable cutter bar, ground engaging and gliding shoes at the ends of said cutter bar, U-shaped members attached to said shoes, a yoke-like lifting and lowering frame mounted for oscillation on the support and having the free ends of its arms formed with lifting fingers pivotally connected to said U-shaped members, an actuating arm carried by said frame, a manually adjusted actuating lever on the support, an operating connection between the lever and arm, together with stabilizing arms attached to the end portion of the frame and connecting chains between said arms and the aforesaid U-shaped members.

2. In a structure of the class described, in combination, a tractor embodying a substantially U-shaped frame having spaced parallel side bars, the ends of one of the side bars terminating in a forwardly and downwardly inclined extension, a plurality of bearings associated with said side bar and extension, power driven wheels mounted on the tractor frame, one of the wheels being provided with a bevelled power take-off gear, a shaft section mounted for rotation in bearings adjacent said gear and provided with a pinion in mesh with the gear, an additional shaft section mounted in bearings on the aforesaid extension and having universal connection with the first-named shaft section, a hanger bearing on the extremity of said extension, a stub shaft mounted for rotation in said hanger bearing, said second-named shaft section being coupled to said stub shaft, an eccentric carried by the stub shaft, a mower embodying a reciprocatory cutter bar, and a pitman connection between the cutter bar and eccentric.

3. In a structure of the class described, in combination, a tractor embodying a wheel-supported frame, an attendant's seat on the rear portion of the frame, a mower structure on the frontal portion of the frame, lifting and lowering means connected with the mower structure and mounted on the adjacent portion of said frame, an adjusting and retaining lever on the frame adjacent the attendant's seat, an operating connection between the lever and lifting and lowering means, a stabilizing connection between the lifting and lowering means and mower structure, said tractor embodying ground engaging wheels, one of the wheels being provided with a motion transmitting gear, flexible shafting operatively connected with said gear and supported for rotation in bearings on the adjacent portion of the tractor frame, an eccentric mounted for rotation on said frame and operatively connected with said shafting, the shafting including a clutch, a remote control for the clutch mounted on the frame near the attendant's seat, and an operating connection between the eccentric and cutter bar of said mower structure.

SWAN P. ECKBERG.